(12) United States Patent
Wakabayashi et al.

(10) Patent No.: US 8,675,145 B2
(45) Date of Patent: Mar. 18, 2014

(54) PROJECTOR

(75) Inventors: Shinichi Wakabayashi, Suwa (JP); Eiji Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 12/972,772

(22) Filed: Dec. 20, 2010

(65) Prior Publication Data

US 2011/0181799 A1 Jul. 28, 2011

(30) Foreign Application Priority Data

Jan. 26, 2010 (JP) ................................. 2010-013928

(51) Int. Cl.
*G02F 1/1335* (2006.01)

(52) U.S. Cl.
USPC .................................................. 349/5; 349/9

(58) Field of Classification Search
USPC ....................... 349/5–9; 353/20, 31
See application file for complete search history.

(56) References Cited

U.S. PATENT DOCUMENTS

| 5,903,388 | A * | 5/1999 | Sedlmayr ...................... 359/283 |
| 2006/0274412 | A1* | 12/2006 | Koyama et al. ............... 359/443 |
| 2009/0323025 | A1* | 12/2009 | Nagumo ......................... 353/20 |

FOREIGN PATENT DOCUMENTS

| JP | A 2009-36819 | 2/2009 |
| JP | A 2010-8638 | 1/2010 |

* cited by examiner

*Primary Examiner* — Edward Glick
*Assistant Examiner* — David Chung
(74) *Attorney, Agent, or Firm* — Oliff PLC

(57) ABSTRACT

A projector includes: a reflection-type polarizing plate which separates entering luminous flux by polarization into first linearly polarized light and second linearly polarized light whose polarization directions cross each other at right angles; a reflection-type light modulation device disposed inclined to the reflection-type polarizing plate to modulate the first linearly polarized light separated by polarization by the reflection-type polarizing plate according to image information and emit the modulated first linearly polarized light toward the reflection-type polarizing plate; a supporting body which supports the reflection-type polarizing plate and the reflection-type light modulation device; and a light shielding member disposed in an area to emit side of the second linearly polarized light which entering the reflection-type polarizing plate before modulation by the reflection-type light modulation device and separated by polarization, and connected with the supporting body.

4 Claims, 2 Drawing Sheets

PROJECTOR

BACKGROUND

1. Technical Field

The present invention relates to a projector.

2. Related Art

Currently, a projector which includes a reflection-type liquid crystal panel such as LCOS (liquid crystal on silicon) as a light modulation device for modulating entering luminous flux according to image information is known (for example, see JP-A-2009-036819).

A projector disclosed in JP-A-2009-036819 has a wire grid which separates entering luminous flux by polarization into first linearly polarized light and second linearly polarized light whose polarization directions cross each other at right angles. In this case, the reflection-type liquid crystal panel and the wire grid are supported by a supporting body.

The first linearly polarized light contained in the respective polarized lights emitted from a light source and separated by the wire grid by polarization enters the reflection-type liquid crystal panel, while the second linearly polarized light as the other polarized light is emitted to the outside of the optical path.

According to the projector disclosed in JP-A-2009-036819, the second linearly polarized light which is contained in the respective polarized lights emitted from the light source and separated by the wire grid by polarization and is emitted to the outside of the optical path illuminates the inner surface of a housing which accommodates and positions the reflection-type liquid crystal panel, the wire grid, the supporting body and others.

In addition, a part of light reflected by optical components disposed downstream of the optical path from the reflection-type liquid crystal panel and the wire grid or by others and returned toward the wire grid is emitted through the wire grid to the outside of the optical path and illuminates the inner surface of the housing similarly to the second linearly polarized light.

In this case, thermal deterioration of the housing may be caused by unnecessary light emitted through the wire grid to the outside of the optical path.

Therefore, such a technology which prevents thermal deterioration of the housing caused by illumination with this unnecessary light to increase the life of the projector has been demanded.

SUMMARY

An advantage of some aspects of the invention is to provide a projector capable of increasing its life.

A projector according to an aspect of the invention includes: a reflection-type polarizing plate which separates entering luminous flux by polarization into first linearly polarized light and second linearly polarized light whose polarization directions cross each other at right angles; a reflection-type light modulation device disposed inclined to the reflection-type polarizing plate to modulate the first linearly polarized light separated by polarization by the reflection-type polarizing plate according to image information and emit the modulated first linearly polarized light toward the reflection-type polarizing plate; a supporting body which supports the reflection-type polarizing plate and the reflection-type light modulation device; and a light shielding member disposed in an area to the emit side of the second linearly polarized light which entering the reflection-type polarizing plate before modulation by the reflection-type light modulation device and separated by polarization, and connected with the supporting body.

According to this structure, the projector includes the light shielding member disposed in the area to the emit side of the second linearly polarized light which entering the reflection-type polarizing plate before modulation by the reflection-type light modulation device and separated by polarization.

In this case, the unnecessary light such as the second linearly polarized light described above and light reflected by optical components disposed downstream of the optical path from the reflection-type light modulation device and the reflection-type polarizing plate or by others, returned toward the reflection-type polarizing plate, and emitted in the same direction as the direction of the second linearly polarized light through the reflection-type polarizing plate illuminates the light shielding member. Thus, the unnecessary light described herein does not illuminate the inner surface of a housing where the reflection-type light modulation device, the reflection-type polarizing plate, the supporting body, the light shielding member and the like are accommodated and positioned. Accordingly, thermal deterioration of the housing can be prevented, and thus the life of the projector can be prolonged.

Since the light shielding member is connected with the supporting body, heat generated on the light shielding member by illumination with the unnecessary light can be transmitted to the supporting body. In this case, the heat releasing property of the light shielding member becomes more preferable compared with a structure which separates the light shielding member from the supporting body. Thus, the temperature increase of the light shielding member can be avoided.

In the projector of the above aspect, it is preferable that the light shielding member and the supporting body are formed integrally with each other.

According to this structure, the light shielding member and the supporting body are formed integrally with each other. In this case, the step for fixing the light shielding member to the supporting body by screws or the like can be eliminated. Thus, compared with a structure which includes the light shielding member and the supporting body individually manufactured, the projector can be easily manufactured.

For increasing the heat releasing property of the light shielding member, it is preferable that the light shielding member has a plurality of fins for functioning as a heat sink.

When the light shielding member is manufactured by sheeting or other methods, the plural fins are difficult to be provided on the light shielding member.

According to this preferred structure of the aspect of the invention, however, the light shielding member and the supporting body are formed integrally with each other by molding. Thus, the plural fins for allowing the light shielding member to function as a heat sink can be easily provided on the light shielding member. Since the light shielding member functioning as a heat sink has a preferable heat release property, heat generated on the reflection-type light modulation device and the reflection-type polarizing plate can be released from the light shielding member after passing through the heat transmission path from the supporting body to the light shielding member. Accordingly, the temperature increase of the reflection-type light modulation device and the reflection-type polarizing plate can also be reduced.

In the projector of the above aspect of the invention, it is preferable that the following points are satisfied: the reflection-type light modulation device includes a device main body which modulates entering luminous flux, and a flexible wiring board electrically connected with the device main body; and the flexible wiring board is drawn toward the light shielding member and attached to the light shielding member in the condition in which the reflection-type light modulation device is supported by the supporting body.

According to this structure, the light shielding member supports the flexible wiring board drawn in the manner described above under the condition in which the reflection-type light modulation device is held by the supporting body.

In this case, the flexible wiring board bent under the condition in which the reflection-type light modulation device is held by the supporting body can be reinforced by the light shielding member. Thus, the electric connection between the flexible wiring board and the device main body can be maintained in a preferable condition.

Moreover, since the flexible wiring board is attached to the light shielding member, the unnecessary light discussed above does not illuminate the flexible wiring board. Thus, thermal deterioration of the flexible wiring board can also be avoided.

In the projector of the above aspect of the invention, it is preferable that the light shielding member is treated by light absorbing processing for absorbing entering luminous flux.

According to this structure, the light shielding member is treated by light absorbing processing. Thus, the unnecessary light that illuminates the light shielding member can be prevented from being reflected by the light shielding member and returned toward the reflection-type polarizing plate. That is, the unnecessary light reflected by the light shielding member is not contained in the projected images, and thus the image quality of the projected images can be maintained in a preferable condition.

Moreover, since the unnecessary light illuminating the light shielding member is absorbed by the light shielding member, leakage of the unnecessary light reflected by the light shielding member to the outside of the projector can be prevented.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment according to the invention is hereinafter described with reference to the drawings.

Structure of Projector

Figure 1:
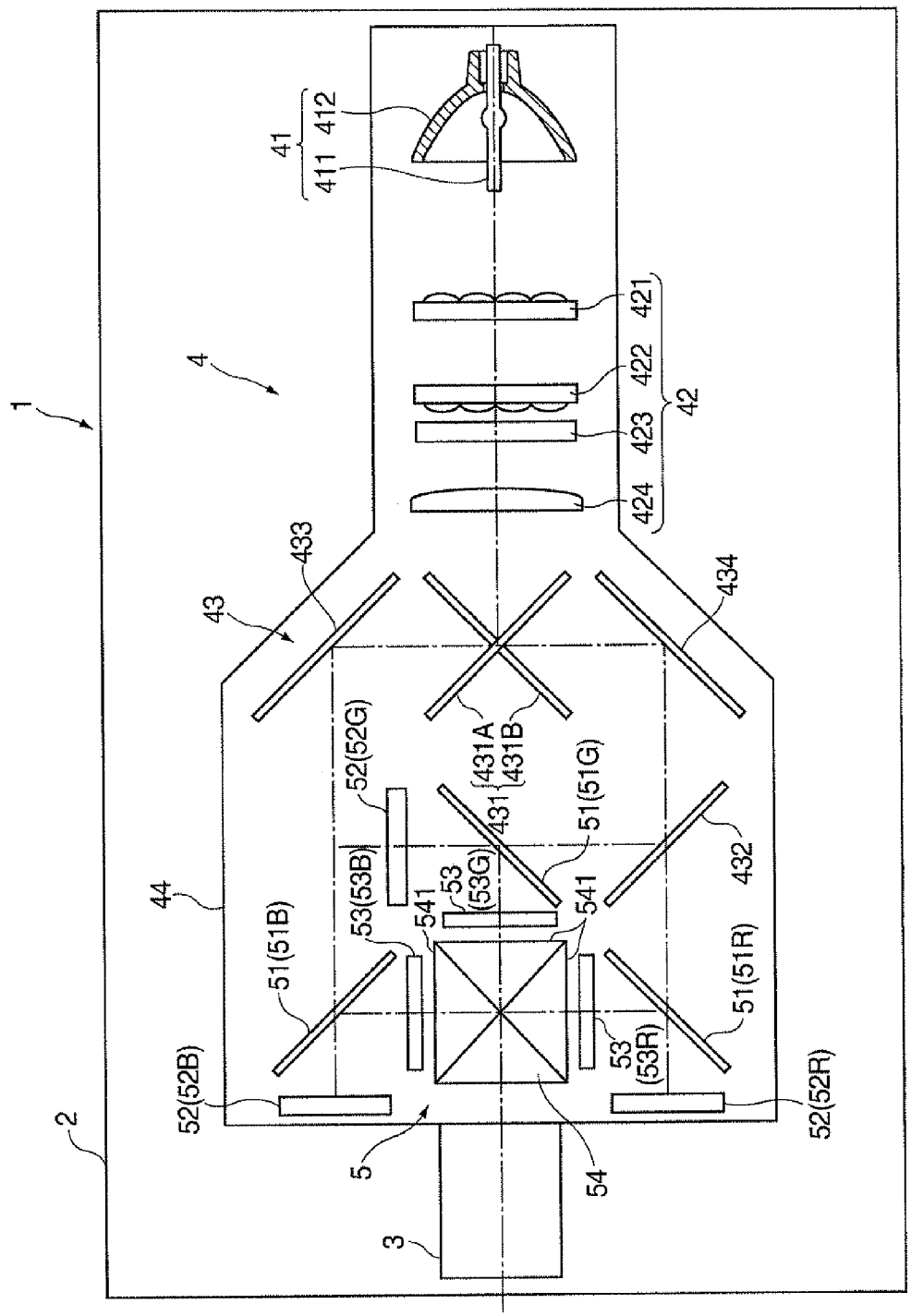
FIG. 1 schematically illustrates the general structure of a projector according to an embodiment.

FIG. 1 schematically illustrates the general structure of a projector 1.

The projector 1 forms image light by modulating light emitted from a light source according to image information, and projects the image light onto a screen (not shown). As illustrated in FIG. 1, the projector 1 includes an external housing 2 constituting the external case of the projector 1, a projection lens 3 as a projection device, an optical unit 4, and other components.

Though not specifically shown in FIG. 1, a cooling unit which has parts such as a cooling fan for cooling the respective components within the projector 1, a power source unit which supplies power to the respective components within the projector 1, a control device for controlling the respective components within the projector 1, and other units are disposed in a space within the external housing 2 other than the positions of the projection lens 3 and the optical unit 4.

The optical unit 4 performs optical processing for light emitted from the light source and forms image light corresponding to image signals under the control of the control device. As illustrated in FIG. 1, the optical unit 4 includes a light source device 41, an illumination device 42, a color separation device 43, an optical device 5, and an optical component housing 44 which accommodates and positions the respective devices 41 through 43 and 5.

The light source device 41 has a light source lamp 411, a reflector 412 and others.

The illumination device 42 contains a first lens array 421, a second lens array 422, a polarization converting element 423 for converting entering luminous flux into substantially one type of linearly polarized light, and a stacking lens 424.

The color separation device 43 includes a cross dichroic mirror 431 which has a B light reflection dichroic mirror 431A for reflecting blue light and a GR light reflection dichroic mirror 431B for reflecting green light and red light disposed in an X shape, a G light reflection dichroic mirror 432 for reflecting green light, and two reflection mirrors 433 and 434.

The light emitted from the light source device 41 and passing through the illumination device 42 enters the cross dichroic mirror 431 to be separated into the blue light component and the green and red light components.

The blue light separated by the cross dichroic mirror 431 is reflected by the reflection mirror 433 and enters a wire grid 51B (described later) constituting the optical device 5.

The green light and the red light separated by the cross dichroic mirror 431 are reflected by the reflection mirror 434 and enter the G light reflection dichroic mirror 432 to be separated into the green light component and the red light component. Then, the green light enters a wire grid 51G (described later) constituting the optical device 5, and the red light enters a wire grid 51R (described later) constituting the optical device 5.

Structure of Optical Device

Figure 2:
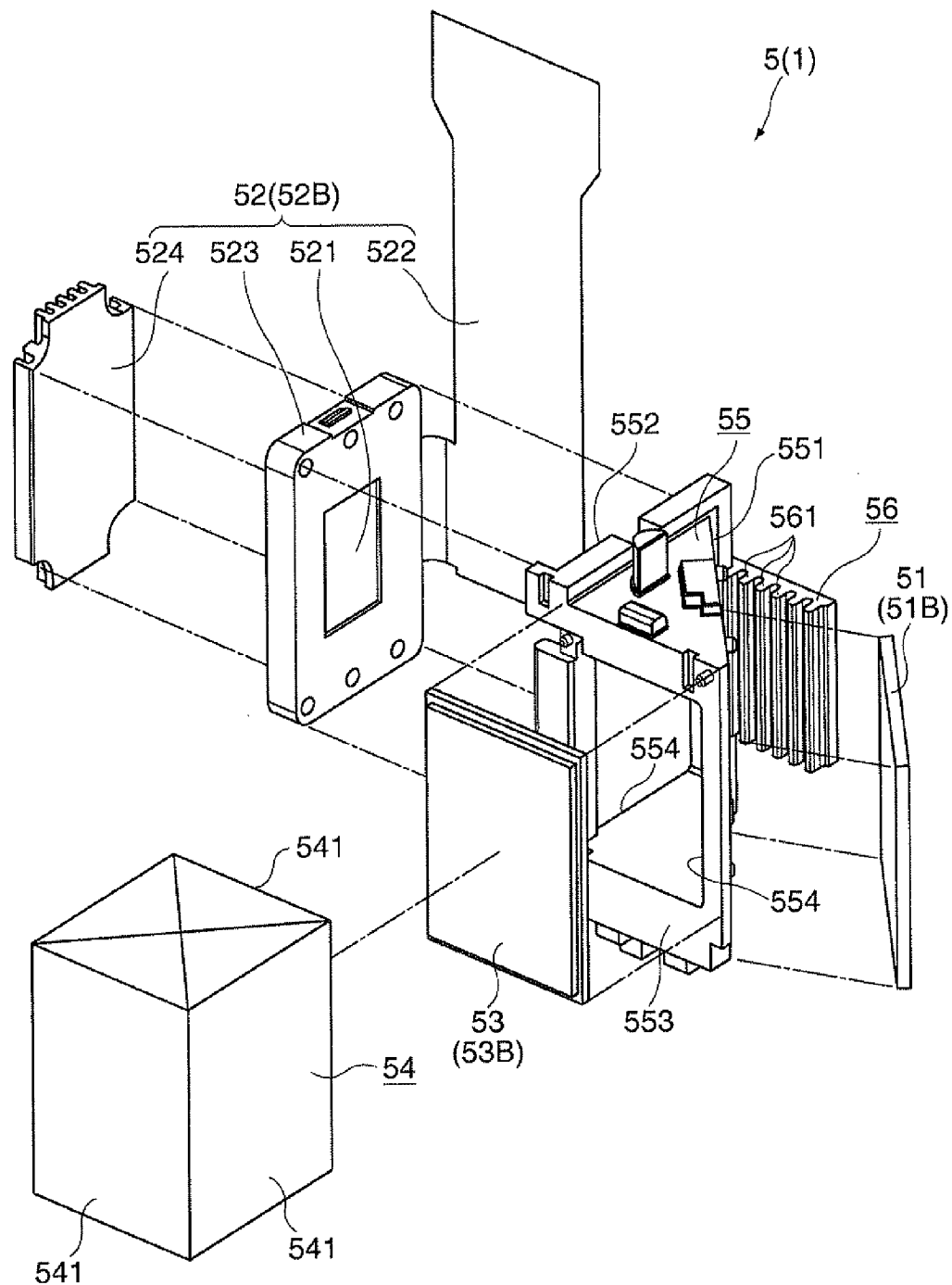
FIG. 2 is a perspective view illustrating the disassembled structure of an optical device according to the embodiment.

FIG. 2 is a perspective view illustrating the disassembled structure of the optical device 5.

FIG. 2 shows only the B light area of the optical device 5, and does not show the R and G light areas of the optical device 5 for convenience of the explanation. However, each of the R and G light areas has a structure similar to that of the B light area.

As illustrated in FIG. 1 or 2, the optical device 5 includes the three wire grids 51 as reflection-type polarizing plates, three reflection-type light modulation devices 52, three polarizing plates 53, a cross dichroic prism 54 as a color combining device, three supporting bodies 55 (see FIG. 2), and three light shielding members 56 (FIG. 2).

FIG. 1 shows the wire grids 51 as the wired grid 51R for red light, the wire grid 51G for green light, and the wire grid 51B for blue light for convenience of the explanation. This applies to the reflection-type light modulation devices 52 and the polarizing plates 53.

Each of the three wire grids 51 separates entering luminous flux by polarization by using diffraction based on the grid structure. As illustrated in FIG. 1 or 2, each of the wire grids 51 is positioned by the corresponding supporting body 55 described later in such a condition as to be inclined to the optical axis of the entering luminous flux approximately at 45 degrees. Each of the wire grids 51 transmits polarized light contained in the entering luminous flux and having substantially the same polarization direction as the polarization direction equalized by the polarization converting element 423 (first linearly polarized light), and reflects polarized light contained in the entering luminous flux and having the polarization direction perpendicular to the polarization direction equalized by the polarization converting element 423 (second linearly polarized light) to separate the entering luminous flux by polarization.

As illustrated in FIG. 2, each of the three reflection-type light modulation devices 52 has a reflection-type liquid crystal panel 521 as a device main body, an FPC 522 as a flexible wiring board, a holding frame 523, and a heat sink 524.

As illustrated in FIG. 1 or 2, each of the reflection-type light modulation devices 52 is disposed by using the corresponding supporting body 55 described later such that the position of the reflection-type liquid crystal panel 521 crosses the optical axis of the light having passed through the corresponding wire grid 51 substantially at right angles.

The reflection-type liquid crystal panel 521 is constituted by a so-called LCOS containing liquid crystals on a silicon substrate.

The FPC 522 electrically connects the control device with the reflection-type liquid crystal panel 521. That is, one end of the FPC 522 is electrically connected with an external circuit connection terminal (not shown) provided in the vicinity of the end corresponding to the longer side of the rectangular shape of the reflection-type liquid crystal panel 521 in the plan view (the side extending in the vertical axis direction) by contact bonding or other methods. The other end of the FPC 522 has a connector (not shown) to be electrically connected with the control device via the connector.

As illustrated in FIG. 2, the FPC 522 has a shape bent approximately in an L shape. A driving IC chip (not shown) is provided at the bent portion of the FPC 522.

The driving IC chip includes a part of a driving circuit for driving the reflection-type liquid crystal panel 521, for example, and electrically and mechanically fixed to the FPC 522.

The reflection-type liquid crystal panel 521 contains the liquid crystals whose orientation conditions are controlled according to signals received from the control device via the FPC 522 and the driving IC chip to modulate the polarization direction of the polarized light transmitted by the wire grid 51 and reflect the modulated light toward the wire grid 51. Then, only the polarized light which is contained in the light modulated by the reflection-type liquid crystal panel 521 and reflected toward the wire grid 51 and has the polarization direction perpendicular to the polarization direction equalized by the polarization converting element 423 is reflected by the wire grid 51 and released toward the prism 54.

The holding frame 523 is a component for holding the reflection-type liquid crystal panel 521 and is made of heat conductive material such as metal.

The heat sink 524 is attached to the back surface of the holding frame 523 to release heat from the reflection-type liquid crystal panel 521 and the holding frame 523.

Each of the three polarizing plates 53 transmits the polarized light having substantially the same polarization direction as the polarization direction of the light modulated by the corresponding reflection-type liquid crystal panel 521 and reflected by the corresponding wire grid 51. Thus, even when the polarized light component other than the desired linearly polarized light is reflected by the wire grid 51, the reflected polarized light component can be removed by the polarizing plate 53. Accordingly, the polarized light component other than the desired linearly polarized light can be eliminated by both the functions of the wire grid 51 and the polarizing plate 53.

As illustrated in FIG. 1 or 2, each of the polarizing plates 53 is disposed opposed to a corresponding light entrance surface 541 of the prism 54 by using the corresponding supporting body 55 described later.

As illustrated in FIG. 1 or 2, the prism 54 has the light entrance surfaces 541 for receiving the respective color lights having passed through the respective polarizing plates 53, and combines the received color lights to form image light. The prism 54 is a substantially square component in the plan view produced by affixing four rectangular prisms, and has two dielectric multilayer films on the boundaries between the affixed rectangular prisms. These dielectric multilayer films transmit green light reflected by the wire grid 51G and reflect the red light and blue light reflected by the wire grids 51R and 51B. The respective color lights combined by this method are formed into image light. The image light produced by the prism 54 is projected onto the screen through the projection lens 3.

Each of the three supporting bodies 55 is made of heat conductive material such as metal, and supports the wire grid 51, the reflection-type light modulation device 52, and the polarizing plate 53 provided for each of the R, G, and B lights.

As illustrated in FIG. 2, each of the supporting bodies 55 is a hollow triangle pole component having a substantially isosceles right triangle horizontal cross section, and has a first side surface 551 as a slope, and a second side surface 552 and a third side surface 553 forming a vertical angle. Each of the side surfaces 551 through 553 has an opening 554.

The wire grid 51 is fixed to the first side surface 551.

The reflection-type light modulation device 52 is fixed to the second side surface 552.

The polarizing plate 53 is fixed to the third side surface 553.

The respective openings 554 are closed by fixing the components 51 through 53 to the side surfaces 551 through 553, respectively, allowing the inside space of the supporting body 55 to be closed. The reflection surface of the reflection-type liquid crystal panel 521 is disposed within this closed space. In this arrangement, dust does not adhere to the reflection surface. Thus, deterioration of projected images caused by shadow of dust adhering to the reflection surface within the projected images or for other reasons can be avoided.

Each of the three light shielding members 56 is constituted by a plate body having heat conductivity such as metal plate, and is connected with the corresponding one of the three supporting bodies 55.

Each of the light shielding members 56 is disposed in the area to which the light entering the wire grid 51 and separated by polarization by the function of the wire grid 51 before modulation by the reflection-type liquid crystal panel 521 (second linearly polarized light) is emitted.

More specifically, as illustrated in FIG. 2, the light shielding member 56 is disposed in such a condition as to extend from the crossing ends of the first side surface 551 and the second side surface 552 in a direction substantially perpendicular to the second side surface 552, and is located opposed to the light entrance surface 541 of the prism 54 with the wire grid 51 interposed between the light shielding member 56 and the light entrance surface 541. The light shielding member 56 covers a part of the wire grid 51 as viewed from the side opposed to the light entrance surface 541.

A plurality of fins 561 are provided on the surface of the light shielding member 56 on the side opposed to the light entrance surface 541 of the prism 54 in such a manner as to extend in the vertical direction from the surface of the light shielding member 56.

According to this embodiment, the supporting body 55 and the light shielding member 56 are constituted by molded components made of aluminum and formed integrally with each other. In addition, each of the supporting body 55 and the light shielding member 56 is treated by black alumite processing (light absorbing processing).

Under the condition in which the reflection-type light modulation device 52 is supported by the supporting body 55, the FPC 522 is bent toward the light shielding member 56, and the bent portion is attached to the light shielding member 56 as illustrated in FIG. 2. The other end of the FPC 522 is drawn to the outside of the optical component housing 44 through an opening (not shown) formed on the top surface of the optical component housing 44 to be connected with the control device.

As described above, in the condition in which the bent portion of the FPC 522 is attached to the light shielding member 56, the driving IC chip fixed to the FPC 522 is connected with the light shielding member 56 such that heat can be transmitted to the light shielding member 56.

According to this embodiment, the following advantages can be offered.

In this embodiment, the projector 1 includes the light shielding member 56 disposed opposed to the light entrance surface 541 of the prism 54 with the wire grid 51 interposed between the light entrance surface 541 and the light shielding member 56.

In this case, unnecessary light (such as the second linearly polarized light entering the wire grid 51 and divided by polarization by the function of the wire grid before modulation by the reflection-type liquid crystal panel 521, and light reflected by the light entrance surface 541 of the prism 54 and the like and transmitted by the wire grid 51) traveling in a direction away from the light entrance surface 541 of the prism 54 illuminates the light shielding member 56. In this case, the unnecessary light does not illuminate the inner surface of the optical component housing 44. Accordingly, thermal deterioration of the optical component housing 44 can be prevented, and thus the life of the projector 1 can be prolonged.

Since the light shielding member 56 is connected with the supporting body 55, heat generated on the light shielding member 56 by illumination with the unnecessary light can be transmitted to the supporting body 55. In this case, compared with a structure which separates the light shielding member 56 from the supporting body 55, the heat releasing property of the light shielding member increases. Thus, the temperature rise of the light shielding member 56 can be avoided.

Moreover, the light shielding member 56 and the supporting body 55 are formed integrally with each other. Accordingly, compared with a structure which includes the light shielding member 56 and the supporting body 55 individually manufactured, the step for fixing the light shielding member 56 to the supporting body 55 by screws or the like can be eliminated, and thus the projector 1 can be easily manufactured.

Furthermore, the light shielding member 56 and the supporting body 55 are molded components formed integrally with each other. In this case, the plural fins 561 for allowing the light shielding member 56 to function as a heat sink can be easily provided on the light shielding member 56. Since the light shielding member 56 functioning as a heat sink has a preferable heat releasing property, heat generated on the reflection-type liquid crystal panel 521, the wire grid 51, and the polarizing plate 53 can be emitd from the light shielding member 56 after passing through the heat transmission path from the supporting body 55 to the light shielding member 56. Accordingly, the temperature increase of the respective components 51, 53 and 521 can also be reduced.

The light shielding member 56 supports the FPC 522 under the condition in which the reflection-type light modulation device 52 is held by the supporting body 55.

In this case, the FPC 522 bent under the condition in which the reflection-type light modulation device 52 is held by the supporting body 55 can be reinforced by the light shielding member 56. Thus, the electric connection between the FPC 522 and the reflection-type liquid crystal panel 521 can be maintained in a preferable condition.

Since the FPC 522 is attached to the light shielding member 56, the unnecessary light described above does not illuminate the FPC 522. Thus, thermal deterioration of the FPC 522 can also be avoided.

The driving IC chip is connected with the light shielding member 56 such that heat can be transmitted to the light shielding member 56. Accordingly, heat generated during operation of the driving IC chip can be emitd through the light shielding member 56 and the supporting body 55, which increases the life of the driving IC chip.

The light shielding member 56 and the supporting body 55 are treated by black alumite processing. Thus, re-entrance of the unnecessary light illuminating and being reflected by the light shielding member 56 into the prism 54 via the wire grid 51 can be prevented. That is, the unnecessary light reflected by the light shielding member 56 is not contained in the projected images, which maintains the image quality of the projected images in a preferable condition.

Since the unnecessary light illuminating the light shielding member 56 is absorbed by the light shielding member 56, leakage of the unnecessary light reflected by the light shielding member 56 to the outside of the projector 1 can be prevented.

The invention is not limited to the embodiment described herein but may be practiced otherwise without departing from the scope of the invention. As such, various changes, improvements and the like containing the following modifications are included in the scope of the invention.

While the wire grid 51 is used as the reflection-type polarizing plate for each of the color lights in this embodiment, the reflection-type polarizing plate may have other structure.

For example, the reflection-type polarizing plate may be constituted by a polymer layered polarizing plate constituted by organic materials which have refractive index anisotropy (double refraction) such as polarization dividing elements formed by dielectric multilayer films and liquid crystal materials stacked in layers, an optical element which includes a combination of a ¼ wavelength plate and a circularly polarizing reflection plate for dividing not polarized light into clockwise circularly polarized light and anticlockwise circularly polarized light, an optical element which separates light into reflection polarized light and transmission polarized light by using Brewster's angle, or a hologram optical element utilizing hologram, for example.

According to this embodiment, the wire grid 51 as the reflection-type polarizing plate for each color light transmits the first linearly polarized light to emit the first linearly polarized light to the reflection-type liquid crystal panel 521, and reflects the second linearly polarized light to the outside of the optical path. However, the wire grid 51 is not limited to this structure.

For example, the reflection-type polarizing plate may reflect the first linearly polarized light to emit the first linearly polarized light to the reflection-type liquid crystal panel 521, and transmit the second linearly polarized light to emit the second linearly polarized light to the outside of the optical path in a manner contrary to that of the wire grid 51.

In this case, the light shielding member 56 is disposed in the area to which the second linearly polarized light is emitd.

While the supporting body 55 for each color light is a triangle pole component having a substantially isosceles right triangle horizontal cross section in this embodiment, the supporting body 55 may have other shapes as long as the supporting body 55 can support the wire grid 51 and the reflection-type light modulation device 52 such that an angle of approximately 45 degrees can be formed by the respective components 51 and 52.

According to this embodiment, the polarizing plate for each color light is disposed on the third side surface 553 of the supporting body 55. However, the polarizing plate 53 may be eliminated, or replaced with a retardation plate, an optical compensating plate, or other optical elements.

While the light shielding member 56 for each color light is treated by black alumite processing as light absorbing process in this embodiment, other processes may be employed.

According to this embodiment, the supporting body 55 and the light shielding member 56 for each color light are formed integrally with each other. However, the supporting body 55 and the light shielding member 56 may be separately manufactured, and the light shielding member 56 may be connected with the supporting body 55 by screws or the like.

While the projector 1 is a three-plate-type projector which includes the three reflection-type light modulation devices 52 in this embodiment, the projector 1 may include one, two, four or more reflection-type light modulation devices 52.

While only the example of the front-type projector which projects images from the screen viewing side has been discussed in this embodiment, the invention is applicable to a rear-type projector which projects images from the side opposite to the screen viewing side.

Accordingly, the invention is applicable to a projector used for the purpose of presentation and home theater.

The present application claim priority from Japanese Patent Application No. 2010-013928 filed on Jan. 26, 2010, which is hereby incorporated by reference in its entirety.

What is claimed is:

1. A projector comprising:
 a reflection-type polarizing plate which separates entering luminous flux by polarization into first linearly polarized light and second linearly polarized light whose polarization directions cross each other at right angles;
 a reflection-type light modulation device disposed inclined to the reflection-type polarizing plate, the reflection-type light modulation device including a reflection-type liquid crystal panel to modulate the first linearly polarized light separated by polarization by the reflection-type polarizing plate according to image information and emit the modulated first linearly polarized light toward the reflection-type polarizing plate, and the reflection-type light modulation device including a heat sink that is attached to a back surface of the reflection-type liquid crystal panel;
 a supporting body which supports the reflection-type polarizing plate and the reflection-type light modulation device;
 a light shielding member disposed in an area to receive the second linearly polarized light which enters the reflection-type polarizing plate before modulation by the reflection-type light modulation device and is separated by polarization, and the light shielding member is connected with the supporting body; and
 a plurality of fins provided on a surface of the light shielding member that receives the second linearly light from the reflection-type polarization plate, the plurality of fins provided to face the reflection-type polarization plate.

2. The projector according to claim 1, wherein the light shielding member and the supporting body are formed integrally with each other.

3. The projector according to claim 1, wherein:
 the reflection-type light modulation device includes a device main body which modulates entering luminous flux, and a flexible wiring board electrically connected with the device main body; and
 the flexible wiring board is drawn toward the light shielding member and attached to the light shielding member in the condition in which the reflection-type light modulation device is supported by the supporting body.

4. The projector according to claim 1, wherein the light shielding member is treated by light absorbing processing for absorbing entering luminous flux.

* * * * *